J. M. JONES.
NUT LOCK.
APPLICATION FILED APR. 28, 1911.

1,005,116.

Patented Oct. 3, 1911.

WITNESSES
L. E. Barkley
A. E. Kinker

INVENTOR
James M. Jones.
by Thinks Ankerman, Attorney

UNITED STATES PATENT OFFICE.

JAMES M. JONES, OF WAYNE, NEBRASKA.

NUT-LOCK.

1,005,116. Specification of Letters Patent. Patented Oct. 3, 1911.

Application filed April 28, 1911. Serial No. 623,952.

*To all whom it may concern:*

Be it known that I, JAMES M. JONES, a citizen of the United States of America, and resident of Wayne, in the county of Wayne and State of Nebraska, have invented certain new and useful Improvements in Nut-Locks, of which the following is a specification.

This invention relates to nut locks and particularly to a nut lock of the character involving a longitudinally disposed locking member interposed between the nut and the bolt and lying in the recesses in the said bolt and nut.

An object of this invention is to provide a nut having a locking member in such relation to the nut that it may be moved into and out of engagement with the bolt, the said locking member being carried by the nut so that it cannot be displaced or lost.

A still further object of this invention is to provide a nut lock which may be readily applied to or removed from engagement with the nut and bolt, the same being under spring pressure so that it will retain its seat between the nut and bolt until properly manipulated.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1:
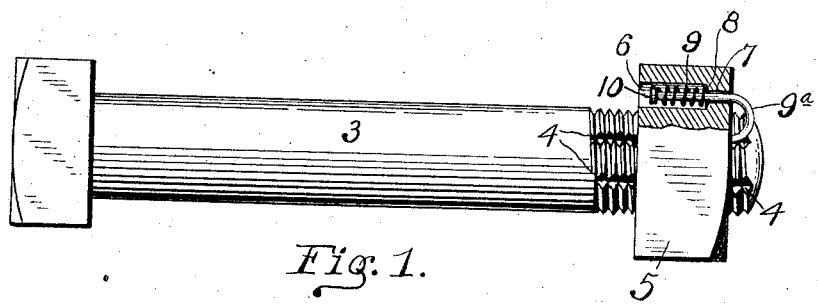
Figure 2:
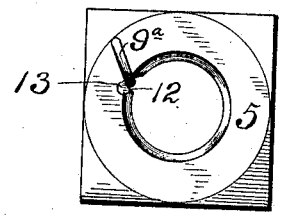
Figure 3:
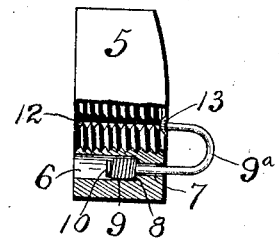

Figure 1 illustrates a view in elevation, partly in section of a nut lock embodying the invention; and Fig. 2 illustrates a top plan view, of a nut showing the upper portion of the inverted U-shaped member and Fig. 3 illustrates a view in elevation and partly in cross section of a nut showing the spring contracted.

In these drawings 3 denotes the bolt which may be of any ordinary type, the same being here shown as having a plurality of longitudinally disposed grooves 4 extending through the threaded portion of the said bolt. The number of grooves is an immaterial detail but it is obvious that by increasing the number, finer adjustment of the bolt on the nut can be had while making the locking member effective, whereas if there are but one or two grooves, it may not be possible to have the locking member in registry with one of the grooves at the time the nut is fully screwed home.

The nut 5 is of ordinary type and is provided with a recess 6 extending from its under side to a point near the upper side and with an aperture 7 extending from the upper side and merging with the recess, the said aperture being of less diameter than the recess so that there is formed at the junction of the recess and aperture a shoulder 8 against which the spring 9 may bear. The locking member proper comprises an inverted U-shaped member 9ª, one side of which is longer than the other side, the said longer side being provided with a shoulder or head 10 to form an abutment for the spring 9 which encircles the longer side of the locking member within the recess. It will be seen from the drawing that the spring tends to force the longer side of the member normally toward the bottom of the nut and hence the shorter side is held in engagement with the bolt in a seat between the said nut and bolt. The nut is preferably provided with a groove 12 extending through the threads thereof from top to bottom and the wall of the groove at the top of the nut is preferably flared slightly to form a camming surface 13 in which the end of the locking member is seated while the nut is being turned. This camming surface is provided for the purpose of causing the end of the locking member to ride over the camming surface into the groove in the bolt when the grooves of the nut and bolt coincide, the spring serving the function of forcing the locking member in the seat between the said nut and bolt.

I claim—

1. In a nut lock, a bolt having longitudinally disposed grooves extending through the threads thereof, a nut having a groove extending through the threads thereof and adapted to register with one or the other of the grooves in the bolt, the said nut having a recess in its under surface and an aperture in its upper surface merging with the recess, a shoulder formed at the merger of the recess and aperture, an approximately U-shaped locking member having one of its sides extending through the aperture in the nut and in the recess thereof, a head on the end of the locking member within the recess, a spring between the head of the locking member and the shoulder of the nut whereby the locking member is forced downwardly, said locking member engaging the nut and bolt and lying in the seat formed by the coinciding grooves.

2. In a nut lock, a bolt having longitudinally disposed grooves extending through the threads thereof, a nut having a groove extending through the threads thereof, the upper or outer end of the groove having a flared wall forming a camming surface, and adapted to register with one or the other of the grooves in the bolt, the said nut having a recess in its under surface and an aperture in its upper surface merging with the recess, a shoulder formed at the merger of the recess and aperture, an approximately U-shaped locking member having one of its sides extending through the aperture in the nut and in the recess thereof, a head on the end of the locking member within the recess, a spring between the head of the locking member and the shoulder of the nut whereby the locking member is forced downwardly, the opposite end of the said locking member being adapted to ride over the camming surface of the wall of the groove into the seat formed by the coinciding grooves of the nut.

In testimony whereof, I affix my signature in the presence of two witnesses.

JAMES M. JONES.

Witnesses:
   D. A. JONES,
   R. W. KING.

---

Copies of this patent may be obtained for five cents each, by addressing the "Commissioner of Patents, Washington, D. C."